(12) United States Patent
Chandra et al.

(10) Patent No.: US 7,580,913 B2
(45) Date of Patent: Aug. 25, 2009

(54) ANALYSIS OF IMPACT OF CHANGE IN AN ORGANIZATIONAL ENTITY

(75) Inventors: Ankur Chandra, Saratoga, CA (US); Douglas Warren McDavid, Elk Grove, CA (US); Jorge L. C. Sanz, Carmel, CA (US); Jennifer Quirin Trelewicz, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/188,600

(22) Filed: Jul. 25, 2005

(65) Prior Publication Data

US 2007/0021994 A1    Jan. 25, 2007

(51) Int. Cl.
*G06F 15/18*   (2006.01)
*G06F 15/00*   (2006.01)

(52) U.S. Cl. .................. 706/62; 705/1; 705/9; 707/102
(58) Field of Classification Search .................. 709/202, 709/205, 225, 226; 705/26; 715/848
See application file for complete search history.

(56) References Cited

U.S. PATENT DOCUMENTS

| 5,442,791 | A * | 8/1995 | Wrabetz et al. ............. 719/330 |
| 6,321,205 | B1 | 11/2001 | Eder |
| 2003/0033182 | A1 | 2/2003 | Stok et al. |
| 2003/0084063 | A1 | 5/2003 | DelMonaco et al. |
| 2006/0074833 | A1 * | 4/2006 | Gardner et al. ............. 706/45 |
| 2006/0074836 | A1 * | 4/2006 | Gardner et al. ............. 706/60 |

FOREIGN PATENT DOCUMENTS

| EP | 1253522 A1 | 10/2002 |
| EP | 1253524 A1 | 10/2002 |

OTHER PUBLICATIONS

Review of Elementary Graph Theory, Jeremy Siek, Inidana University, 2000-2001.*
Trelewicz, et al.; Informatics For Business Is More Than Process Automation: i-Business > e-Process;invited paper in Information Technologies and Control; v.2, n.2; 2004; pp. 2-7; and invited plenary paper in Proc. of Int'l Conf on Automatics and Informatics, (Sofia, Bulgaria) Oct. 6-8, 2004.

(Continued)

*Primary Examiner*—David R Vincent
*Assistant Examiner*—Kalpana Bharadwaj
(74) *Attorney, Agent, or Firm*—Schmeiser, Olsen & Watts

(57) ABSTRACT

A method and system for analyzing impact of change in an organizational entity. A graph H includes nets, nodes of the nets, edges connecting the nodes, and edge weights for the edges. The edge weights denote changes in some nodes resulting from changes in other nodes. For a given set Z of nodes A and for each node B characterized by a set S of at least one path of edges connecting nodes of H from node A to node B for each node A of Z, a measure M(Z,B) of a change in node B resulting from a change in each node A of Z is determined. M(Z,B) is a function of the edge weights in each path of S. Each node B of H is displayed via a graphical representation G(B) assigned to each node B. G(B) is a function of M(Z,B).

20 Claims, 14 Drawing Sheets

OTHER PUBLICATIONS

Karakostas, V.; Automating the Task of Change Impact Analysis in Organisations; EXPERSYS-97; Knowledge Modeling, Management and Learning; pp. 327-331.

Porter, Michael; What is Strategy?; Harvard Business Review; Nov.-Dec. 1996; pp. 61-78.

Painter, et al.; A Methodology for Integrating Business Process and Information Infrastructure Models; Proceedings of the 1996 Winter Simulation Conference Dec. 8-11, 1996; pp. 1305-1312.

McDavid, D.W.; A standard for business architecture description; IBM Systems Journal, vol. 38, No. 1; 1999; pp. 12-31.

Sia, et al.; Enterprise Resource Planning (ERP) Systems as a Technology of Power: Empowerment or Panoptic Control?; The Data Base for Advances in Information Systems—Winder 2002; vol. 33, No. 1; pp. 23-37.

IEEE International Conference on Software Maintenance—1999 (ICSM'99); "Software Maintenance for Business Change"; Aug. 30-Sep. 3, 1999.

* cited by examiner

Impact of Change in Node 1.

| Impacted Node | Path(s) To Impacted Node | Calculation of Path Length | Path Length | Maximum Path Length | Unweighted Sum of Path Lengths |
|---|---|---|---|---|---|
| 1 | 1-2-3-4-5-2-1 | .7*.2*.6*.9*.3*.6 | .014 | .022 | .036 |
|   | 1-2-5-4-3-2-1 | .7*.5*.7*.5*.3*.6 | .022 |   |   |
| 2 | 1-2 | .7 | .700 | .700 | .700 |
| 3 | 1-2-3 | .7*.2 | .140 | .140 | .262 |
|   | 1-2-5-4-3 | .7*.5*.7*.5 | .122 |   |   |
| 4 | 1-2-3-4 | .7*.2*.6 | .084 | .245 | .329 |
|   | 1-2-5-4 | .7*.5*.7 | .245 |   |   |
| 5 | 1-2-5 | .7*.5 | .350 | .350 | .426 |
|   | 1-2-3-4-5 | .7*.2*.6*.9 | .076 |   |   |
| 6 | 1-2-5-6 | .7*.5*.4 | .140 | .140 | .170 |
|   | 1-2-3-4-5-6 | .7*.2*.6*.9*.4 | .030 |   |   |

FIG. 7

Impact of Change in Nodes 1 and 6.

| Impacted Node | Path(s) To Impacted Node | Calculation of Path Length | Path Length | Maximum Path Length | Unweighted Sum of Path Length |
|---|---|---|---|---|---|
| 1 | 1-2-3-4-5-2-1 | .7*.2*.6*.9*.3*.6 | .015 | .144 | .231 |
| | 1-2-5-4-3-2-1 | .7*.5*.7*.5*.3*.6 | .022 | | |
| | 6-5-2-1 | .8*.3*.6 | .144 | | |
| | 6-5-4-3-2-1 | .8*.7*.5*.3*.6 | .050 | | |
| 2 | 1-2 | .7 | .700 | .700 | 1.024 |
| | 6-5-2 | .8*.3 | .240 | | |
| | 6-5-4-3-2 | .8*.7*.5*.3 | .084 | | |
| 3 | 1-2-3 | .7*.2 | .140 | .280 | .590 |
| | 1-2-5-4-3 | .7*.5*.7*.5 | .122 | | |
| | 6-5-2-3 | .8*.3*.2 | .048 | | |
| | 6-5-4-3 | .8*.7*.5 | .280 | | |
| 4 | 1-2-3-4 | .7*.2*.6 | .084 | .560 | .918 |
| | 1-2-5-4 | .7*.5*.7 | .245 | | |
| | 6-5-4 | .8*.7 | .560 | | |
| | 6-5-2-3-4 | .8*.3*.2*.6 | .029 | | |
| 5 | 1-2-5 | .7*.5 | .350 | .800 | 1.226 |
| | 1-2-3-4-5 | .7*.2*.6*.9 | .076 | | |
| | 6-5 | .8 | .800 | | |
| 6 | 1-2-5-6 | .7*.5*.4 | .140 | .170 | .197 |
| | 1-2-3-4-5-6 | .7*.2*.6*.9*.4 | .030 | | |
| | 6-5-4-3-2-5-6 | .8*.7*.5*.3*.5*.4 | .017 | | |
| | 6-5-2-3-4-5-6 | .8*.3*.2*.6*.9*.4 | .010 | | |

FIG. 8

ANALYSIS OF IMPACT OF CHANGE IN AN ORGANIZATIONAL ENTITY

BACKGROUND OF THE INVENTION

1. Technical Field

The present invention relates to a method and system for analyzing an impact of change in an organizational entity.

2. Related Art

Changes within an organizational entity (i.e., a for-profit business entity, a non-profit business entity, governmental entity, etc.) may result from changes elsewhere in the entity, and the resultant changes in the entity may have a significant impact on the organizational entity (e.g., business results for a business entity). However, this impact may be difficult to analyze if the changes elsewhere in the organizational entity propagate in a complicated manner through the organizational entity. Thus there is a need for an organized method of analyzing changes within an organizational entity resulting from changes elsewhere in the organizational entity.

SUMMARY OF THE INVENTION

The present invention provides a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node (e.g., the monetary cost of the task transition associated with the edge, or hierarchical nature of the connection between the two items, or the time required for the task transition) and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

The present invention provides a computer program product, comprising a computer usable medium having a computer readable program that when executed on a computer causes the computer to perform a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

The present invention provides a computer system comprising a processor and a computer readable memory unit coupled to the processor, said memory unit containing instructions that when executed by the processor implement a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

The present invention provides a process for deploying computing infrastructure, said process comprising integrating computer-readable code into a computing system, wherein the code in combination with the computing system is capable of performing a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

The present invention provides an organized method of analyzing changes within an organizational entity resulting from changes elsewhere in the organizational entity.

BRIEF DESCRIPTION OF THE DRAWINGS

FIG. 7 is a table depicting calculation of a measure of change in each node of FIG. 6 resulting from a change in one of the nodes of FIG. 6, in accordance with embodiments of the present invention.

FIG. 8 is a table depicting calculation of a measure of change in each node of FIG. 6 resulting from a change in two of the nodes of FIG. 6, in accordance with embodiments of the present invention.

DETAILED DESCRIPTION OF THE INVENTION

Figure 1:
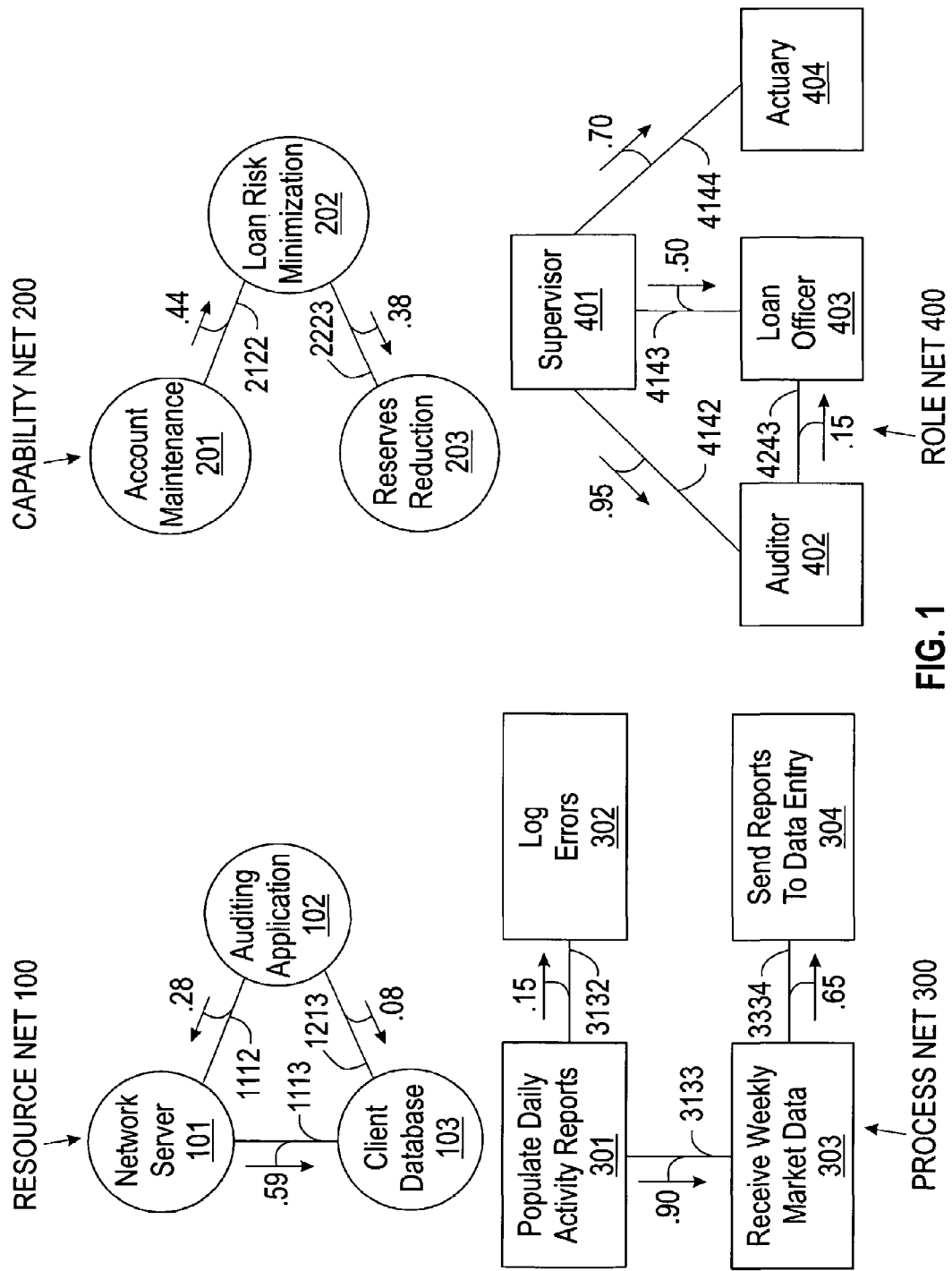
FIG. 1 depicts a resource net, a capability net, a process net, and a role net of an organizational entity, in accordance with embodiments of the present invention.

The present invention discloses a method and system for an analyzing how a change occurring in one or more aspects of an organizational entity impacts other aspects of the organizational entity. The present invention also discloses how such impacts may be graphically represented.

An "organizational entity" is any form of organization having organizational units (e.g., a business entity, a non-profit entity, a governmental entity, etc.). Examples of a business entity include: sole proprietorship, general partnership, limited partnership, corporation, limited liability company, limited liability partnership, and a business combination. Examples of business combinations include: mergers, joint ventures, consolidation, acquisition, strategic alliance, association, etc.

An organizational entity may described in terms of its organizational units representing "semantics" of the organizational entity. A "semantics" of an organizational entity is a category or aspect of the organizational entity. For example, the organizational entity may comprise four units respectively having a resource semantics, a process semantics, a capability semantics, and a role semantics.

As will be discussed in detail infra, the semantics of an organizational entity may be represented graphically in a graph. Each semantics in the graph is represented by a net comprising interconnected nodes, wherein the nodes of the net represent the components of the semantics. Thus, a resource semantics is represented as a resource net, a process semantics is represented as a process net, a capability semantics is represented as a capability net, and a role semantics is represented as a role net.

As an example of said interconnected nodes, each interconnection between a first node and a second node of the net is represented by a line (called an "edge") therebetween and two edge weights associated with the edge. The edge represents a coupling between the first and second nodes. A first edge weight of the two edge weights denotes (i.e., serves as an indication of) a change in the second node resulting from a change in the first node. A second weight of the two edge weights denotes (i.e., serves as an indication of) a change in the first node resulting from a change in the second node. Thus, a denoted change in a node relating to an edge weight is a value indicative of a change in the node which may be in some embodiments the value of the change itself, a function of the value of the change, a value representing the change, etc. (e.g., the monetary cost of the task transition associated with the edge, hierarchical nature of the connection between the two items, the time required for the task transition, etc.).

Nodes of different semantics of the graph may also be connected by edges and associated edge weights, since nodes of different nets may be mutually coupled and since a change at a node of a first net may result in a change in a node of a second net.

Resources of a resource semantics are elements (i.e., nodes) in the organizational entity that may be accessed to provide some functionality or input required for the execution of an activity. Resources themselves are not considered to be activities, but rather, passive elements in the organizational entity. Resources nodes of a resource net may include, inter alia, buildings, vehicles, processing machines, supplies, raw materials, subassemblies, software applications, and databases, knowledge repositories, etc. Edge connections are made from the resource node that performs the access. For example, an accounting application may access a database. The edge weight of the connection reflects a degree of dependence that one resource has on another insofar as a change in the one resource results in a change in the other resource. Some processes and capabilities may require access to one or more resources. Connections may be made for each resource required.

Processes of a process semantics comprise time-ordered sequences of activities that are executed in the operation of the organizational entity. Process nodes of a process net may include, inter alia, computing a value, writing a report, displaying an output of a calculation, producing a part of an automobile, etc. Process nets of a process semantics, or between two process semantics, may be hierarchical; that is, one process in a process net may itself be a process net. A node of a process net may represent a process step of the associated process semantics. Edge connections between nodes of a process net represent the sequence of process flow from each node to each subsequent node and the impact of a change in each process node on the subsequent nodes of the process. Some processes are bidirectional. For example, it may be possible for process A to transition to process B, and for process B to transition to process A, with consequential occurrence of a change in B resulting from a change in A, and a change in A resulting from a change in B. The edge weights of the edges in a process net may represent the monetary cost of this step in the process flow, or the complexity of this step in the process flow (e.g., amount of training required).

Capabilities of a capability semantics provide ways of looking at an organizational entity, (e.g., organizational area such as business area) from the perspective of what the organizational entity is able to do or provide in the way of useful affordances toward the accomplishment of desired results (e.g., business results for a business entity). A result is something valued by the organizational entity or one of its stakeholders, and elicits work or other investment in order that such a result can be realized. A capability represents an ability of the organizational entity to provide or produce some result (e.g., by performing an action). A capability net results from analyzing dependencies among various capabilities that have been identified. Capability nodes of a capability net may include, inter alia, a capability of minimizing loan risk, a capability of maintaining client accounts, etc. Capabilities are distinguished from processes, in that processes rely on a time-ordered sequence for definition, whereas capabilities have no explicit time sequence and instead facilitates achievement of a result. If an edge connects an enabled capability and an enabling capability, then an edge weight associated with the edge reflects a degree to which a change in the enabling capability results in a change in the enabled capability.

Roles of a role semantics represent roles played by people in the organizational entity. Edge connections may be made from one role that "reports to" another. For a reporting role that reports to a plurality of roles, the there will be an edge between the reporting role and each role of the plurality of roles. The edge weights of an edge within a role net, or between two role nets, indicates a degree of change in each said role node due to a change in the other said role net. For example, consider a reporting relationship of an auditor to his/her personnel manager and to his/her team leader in a matrix organization. The personnel manager may only affect the auditor in personnel reviews and promotions, whereas the team leader may be required to authorize all transactions. This would give the personnel manager a relatively weak edge connection which is reflected in the associated edge weight, and the team leader a stronger connection which is likewise reflected in the associated edge weight. Role nodes of a role net may include, inter alia, a supervisor, a loan officer, an auditor, an actuary, etc.

While the preceding discussion described one net of each semantics, each semantics generally comprises one or more nets. For example a given semantics of the organizational entity may consist of exactly one net of interconnected nodes. Alternatively, the given semantics of the organizational entity may comprise a plurality of nets such that a node of a first net of the plurality of nets is connected to a node of at least one other net, wherein the at least one other net is a second net of the plurality of nets, a net of another semantics of the organizational entity, or a combination thereof.

FIG. 1 depicts a resource net 100, a capability net 200, a process net 300, and a role net 400 of an organizational entity, in accordance with embodiments of the present invention.

The resource net 100 comprises a network server node 101, an auditing application node 102, and a client database node 103. Nodes 101 and 102 are coupled by edge 1112. Nodes 102 and 103 are coupled by edge 1213. Nodes 101 and 103 are coupled by edge 1113.

The capability net 200 comprises an account maintenance node 201, a loan risk minimization node 202, and a reserves reduction node 203. Nodes 201 and 202 are coupled by edge 2122. Nodes 202 and 203 are coupled by edge 2223.

The process net 300 comprises a populating daily activities reports node 301, a logging errors node 302, a receiving weekly market data node 303, and a sending reports to data entry node 304. Nodes 301 and 302 are coupled by edge 3132. Nodes 301 and 303 are coupled by edge 3133. Nodes 303 and 304 are coupled by edge 3334.

The role net 400 comprises a supervisor node 401, an auditor node 402, a loan officer node 403, and an actuary node 404. Nodes 401 and 402 are coupled by edge 4142. Nodes 401 and 403 are coupled by edge 4133. Nodes 401 and 404 are coupled by edge 4144. Nodes 402 and 403 are coupled by edge 4243.

Figure 2:
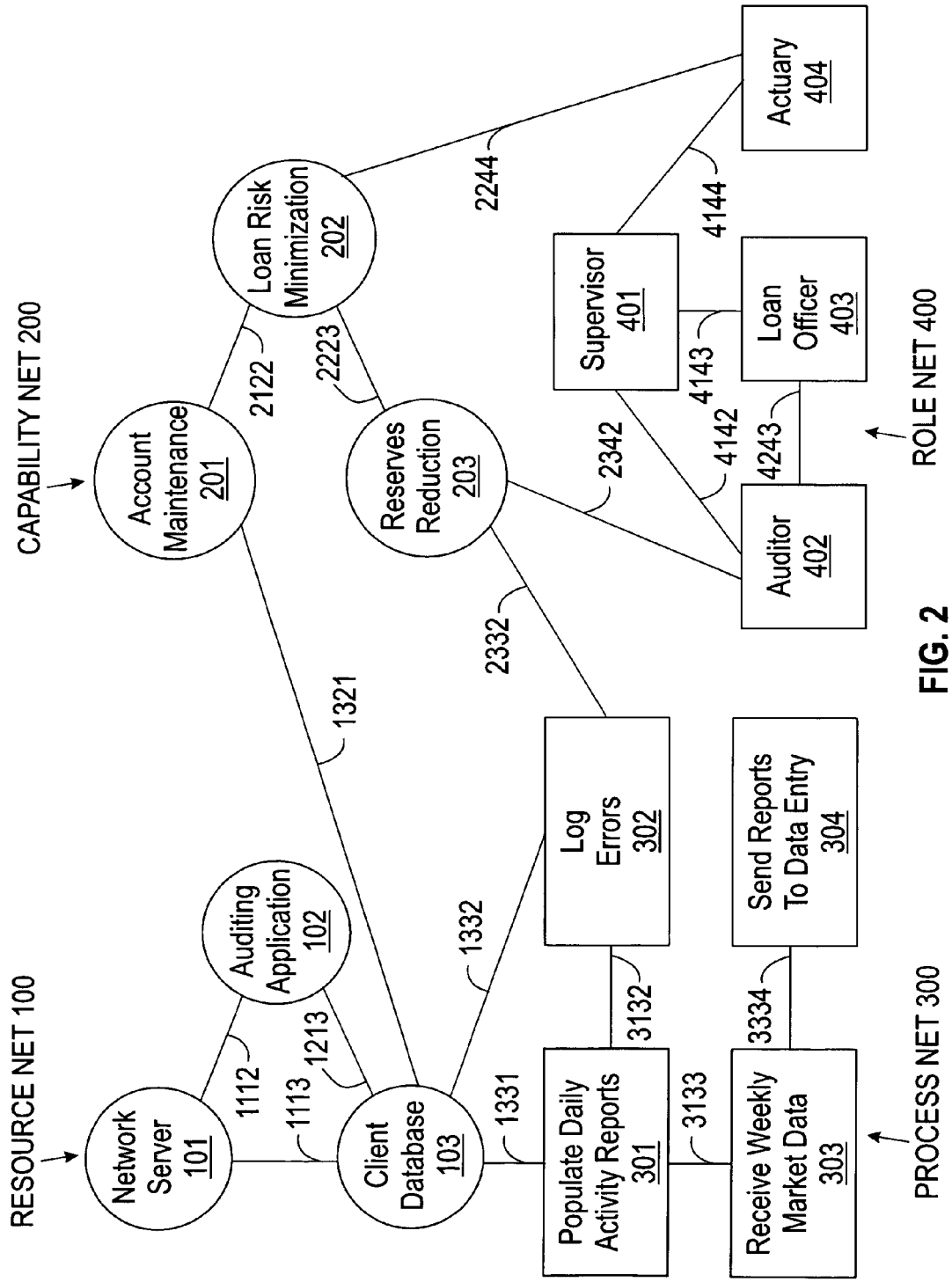
FIG. 2 depicts a graph comprising the nets of FIG. 1 with indicated edges between the nets, in accordance with embodiments of the present invention.

FIG. 2 depicts a graph comprising the nets of FIG. 1 with indicated edges between the nets, in accordance with embodiments of the present invention. Node 103 of the resource net and node 301 of the process net are coupled by edge 1331. Node 103 of the resource net and node 302 of the process net are coupled by edge 1332. Node 103 of the resource net and node 201 of the capability net are coupled by edge 1321. Node 203 of the capability net and node 302 of the process net are coupled by edge 2332. Node 203 of the capability net and node 402 of the role net are coupled by edge 2342. Node 202 of the capability net and node 404 of the role net are coupled by edge 2244.

Figure 3:
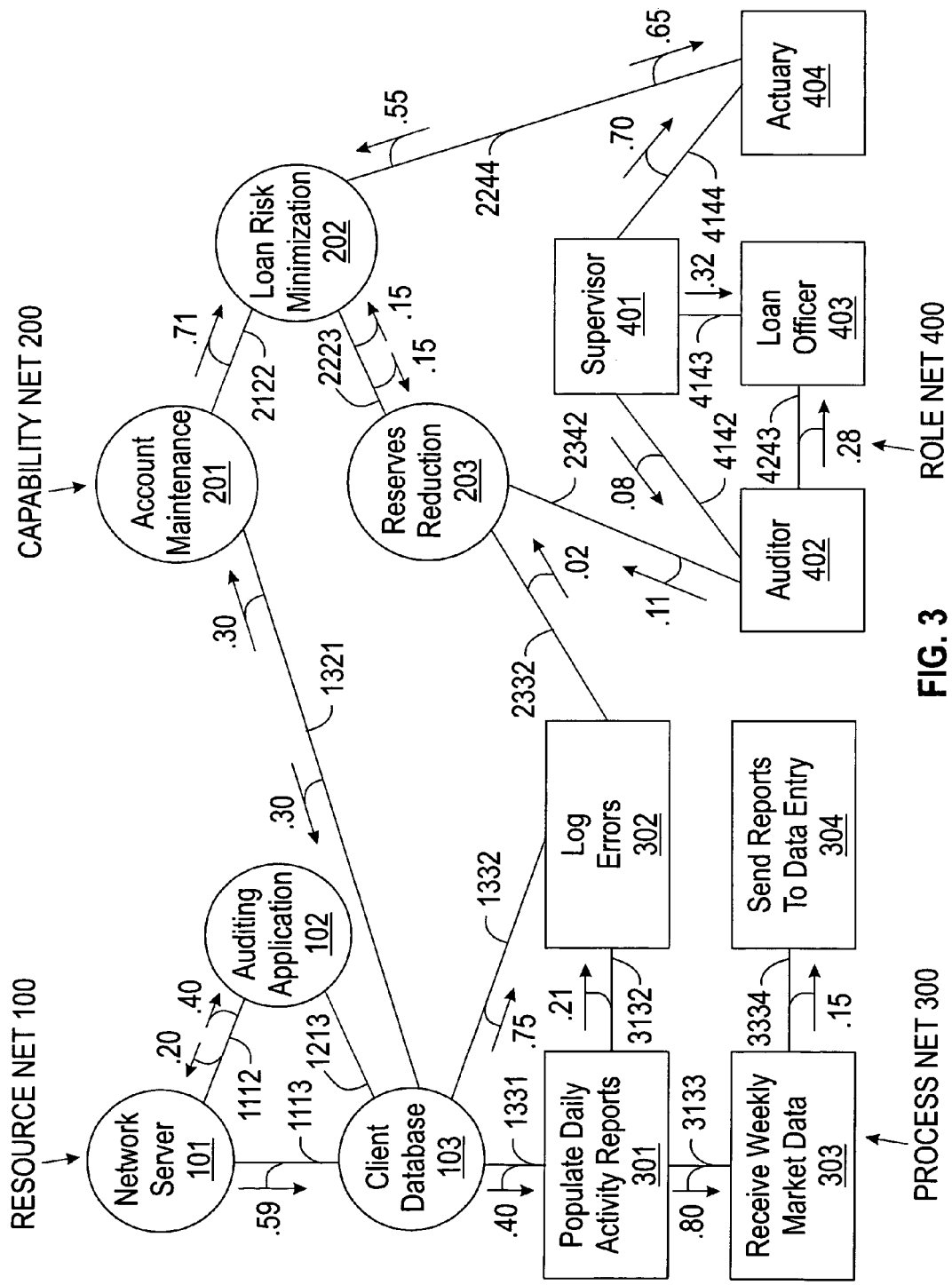
FIG. 3 depicts the graph of FIG. 2 with indicated edge weights, in accordance with embodiments of the present invention.

FIG. 3 depicts the graph of FIG. 2 with indicated edge weights, in accordance with embodiments of the present invention. Although each edge has two edge weights, only non-zero edge weights are actually shown in FIG. 3. Thus the edges in FIG. 3 for which only one edge weight is shown implies that the edge weight that is not shown for the edge is zero. Each edge weight is shown as a vector with an associated weight value, wherein the weight value for an edge weight pointing from a first node to a second node denotes the change in the second node resulting from a change in the first node, as illustrated by a few examples.

The edge weight 1113 points from node 101 to node 103 and has a weight value of 0.59, which means that 0.59 denotes a change in node 103 resulting from a change in node 101.

The edge weight 2342 points from node 402 to node 203 and has a weight value of 0.11, which means that 0.11 denotes a change in node 203 resulting from a change in node 402.

Two edge weights are shown for edge 1112. The first edge weight for edge 1112 points from node 101 to node 102 and has a weight value of 0.40, which means that 0.40 denotes a change in node 102 resulting from a change in node 101. The second edge weight for edge 1112 points from node 102 to node 101 and has a weight value of 0.20, which means that 0.20 denotes a change in node 101 resulting from a change in node 102. Note that node 101 has twice the effect on node 102 that node 102 has on node 101 (i.e., 0.40/0.20=2), which illustrates that the two edge weights for an edge may have different values.

Two edge weights are shown for edge 1321. The first edge weight for edge 1321 points from node 103 to node 201 and has a weight value of 0.30, which means that 0.30 denotes a change in node 201 resulting from a change in node 103. The second edge weight for edge 1321 points from node 201 to node 103 and has a weight value of 0.30, which means that 0.30 denotes a change in node 103 resulting from a change in node 201. Note that nodes 103 and 201 have the same effect on each other (i.e., 0.30/0.30=1), which illustrates that the two edge weights for an edge may have the same value.

The significance of the edge weights depends on the relative magnitude of the edge weights with respect to one another as distributed throughout the graph. Assigning the two edge weights for an edge between two nodes, node 1 and node 2, is context dependent in consideration of the nets that comprise nodes 1 and 2, and of the manner in which nodes 1 and 2 interact with each other. For example with respect to the auditing application 102 and the network server 101 of FIG. 1, if the auditing application 102 is enhanced to include calculations that are classified at a higher security level than can be accommodated by the network server 101, then the network server 101 must be consequently upgraded to accommodate the new higher security level, which may increase cost and/or manpower, resulting in a weight that is reflective of said increased cost and/or manpower. As another example, if the supervisor 401 in the role net of FIG. 1 is replaced by another supervisor of increased training and knowledge, the auditor 402, loan officer 403, and actuary 404 may each have their performance improved to an extent that their performance is positively affected by the training and knowledge of the supervisor 401, and the associated edge weights may reflect a monetary equivalent of their improved performance. In one embodiment, an edge weight W(1,2) denoting a change (D2) in node 2 resulting from a change (D 1) in node 1 may be a function of the partial derivative $\partial(D2)/\partial(D1)$.

Figure 4:
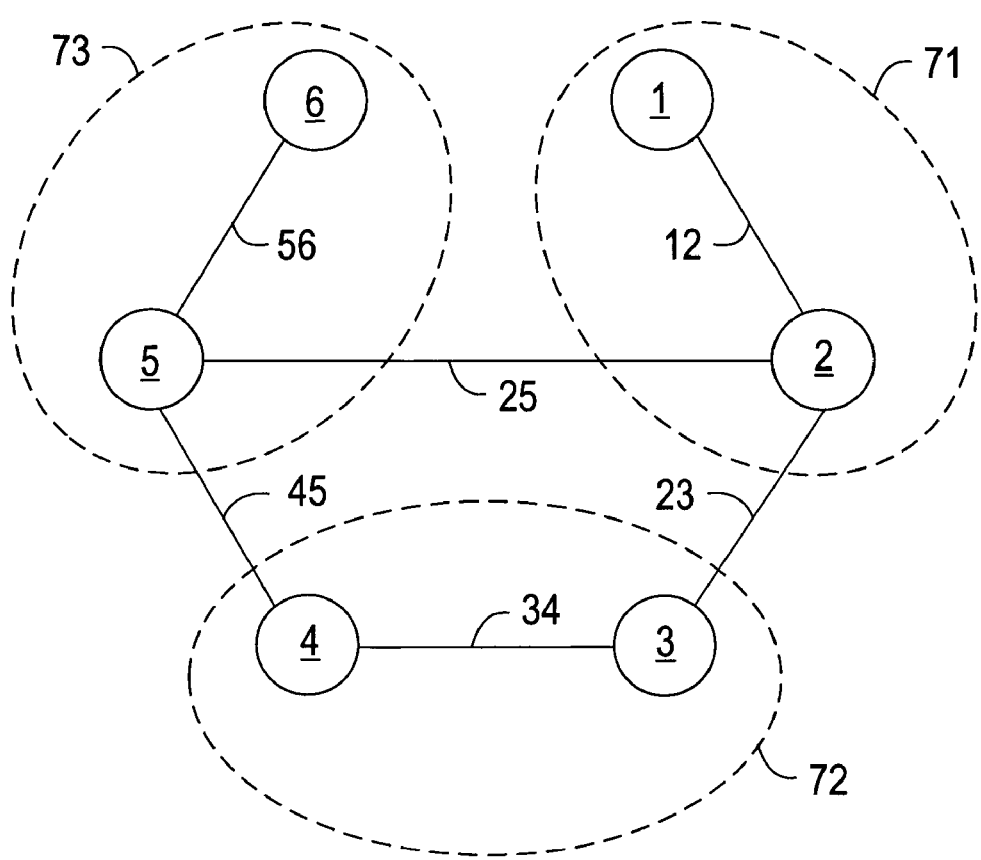
FIGS. 4-5 depicts nodes of a graph with different net configurations, in accordance with embodiments of the present invention.
Figure 5:
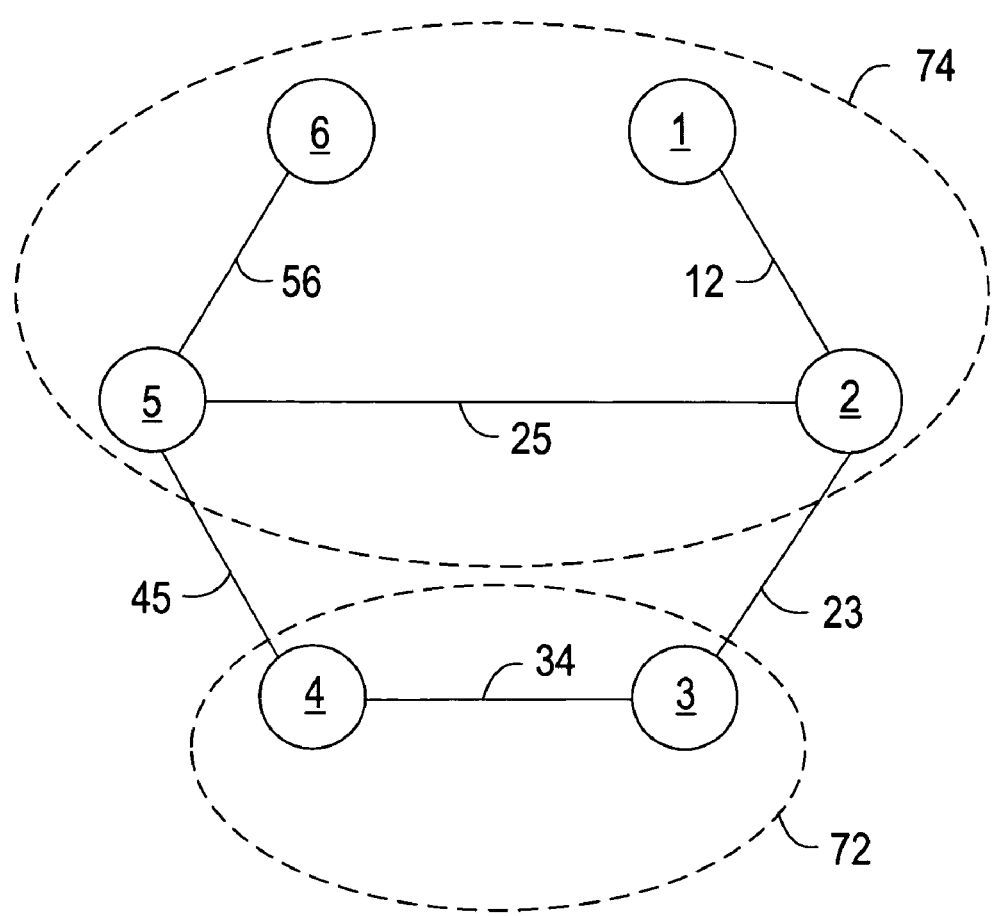

FIGS. 4-5 depict nodes 1-6 of a graph with different net configurations, in accordance with embodiments of the present invention. Nodes 1 and 2 are coupled by edge 12. Nodes 2 and 3 are coupled by edge 23. Nodes 3 and 4 are coupled by edge 34. Nodes 4 and 5 are coupled by edge 45. Nodes 5 and 6 are coupled by edge 56. Nodes 2 and 5 are coupled by edge 25. Nodes 1 and 6 are not directly coupled. In FIG. 4, net 71 comprises nodes 1 and 2, net 72 comprises nodes 3 and 4, and net 73 comprises nodes 5 and 6. In FIG. 5, net 72 comprises nodes 3 and 4 (as in FIG. 4) and net 74 comprises nodes 1, 2, 5, and 6. Nets 71 and 72 of FIG. 4 each have the same semantics. Nets 73 of FIG. 4 and net 74 of FIG. 5 each have a semantics that differs from the semantics of nets 71 and 72.

Figure 6:
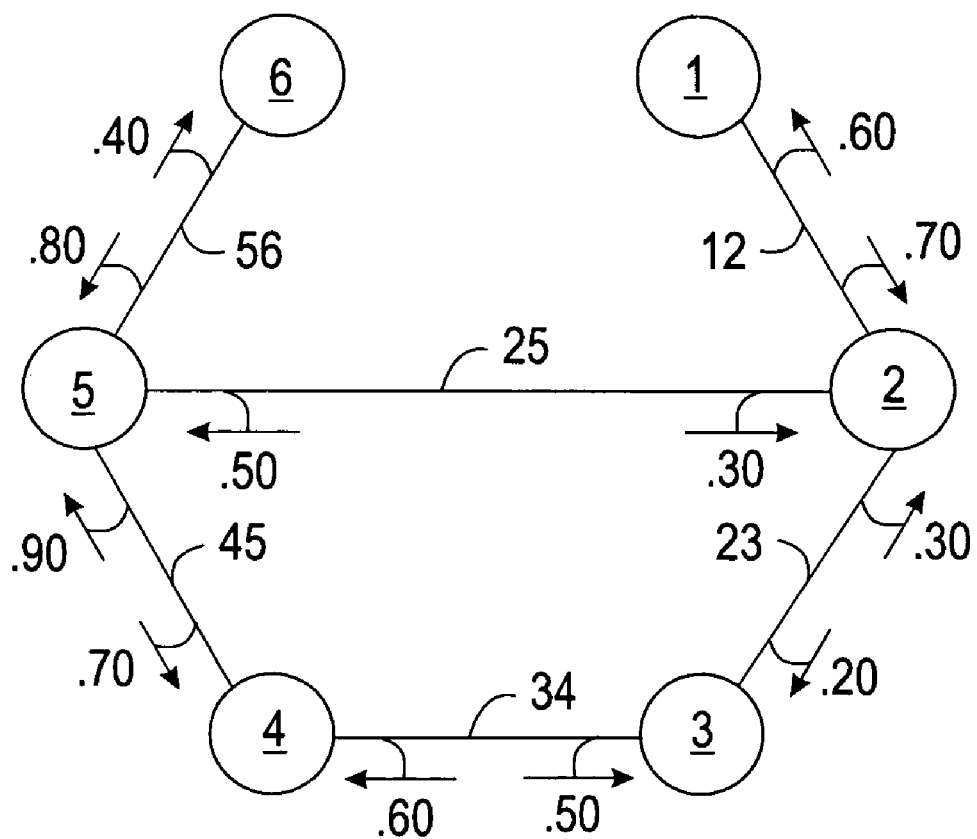
FIG. 6 depicts the graph of FIGS. 4-5 with added edge weights and the nets deleted for simplicity, in accordance with embodiments of the present invention.

FIG. 6 depicts the graph of FIGS. 4-5 with added edge weights and the net indications deleted for simplicity, in accordance with embodiments of the present invention. Two non-zero edge weights are shown for each edge, indicating that the each node of the two nodes connected by each edge are changed as a result of a change in the other node of the two connected nodes. For example for edge 34 connecting nodes 3 and 4, a first edge weight of 0.60 denotes a change in node 4 resulting from a change in node 3, and a second edge weight of 0.50 denotes a change in node 3 resulting from a change in node 4.

If a change occurs in node 1 each node in the graph of FIG. 6 is impacted by a corresponding change in accordance with the edge weights shown in FIG. 6. For example, the effect of a change in node 5 resulting from a change in node 1 may be determined by considering all relevant paths from node 1 to node 5. For each such relevant path, each edge in the relevant path has a non-zero edge weight that points in a direction from node 1 to node 5. FIG. 6 shows two such paths, namely 1-2-5 and 1-2-3-4-5. The path length of a path from node 1 to node 5 is defined as a function of the edge weights of the edges along the path for the edge weights pointing from node 1 to node 5 (e.g., the product or sum of the edge weights of the edges along the path for edge weights pointing from node 1 to node 5). The examples presented herein calculate the path length as the product of the successive edge weights along the path for illustrative purpose only, recognizing that other functions of the edge weights may be employed such as a weighted or unweighted sum of the edge weights along the path or other functional forms.

Accordingly, for the path 1-2-5, the path length is 0.7*0.5=0.35. For the path 1-2-3-4-5, the path length is 0.7*0.2*0.6*0.9=0.076. A measure M(1,5) of the change in node 5 resulting from a change in node 1 is a function of the computed path lengths of the paths from node 1 to node 5. In one embodiment, M(1,5) is the maximum path length of 0.35 since 0.35 is the maximum of 0.35 and 0.076. In one embodiment, M(1,5) is an unweighted sum (0.426) the path lengths, since the sum of 0.35 and 0.076 is 0.426. In one embodiment, each path is assigned a path weight and M(1,5) is the weighted sum of the path lengths. For example, if the path weights for the paths 1-2-5 and 1-2-3-4-5 are 0.25 and 0.75, respectively, then M(1,5) is 0.25*0.35+0.75*0.076=0.144.

FIG. 7 is a table depicting calculation of a measure of change M(1,n) in each node n (n=1, 2, 3, 4, 5, 6) of FIG. 6 resulting from a change in node 1 of FIG. 6, in accordance with embodiments of the present invention. For values of n other than n=5, the measure M(1,n) has been computed in fashion similar to the computation of M(1,5) described supra. FIG. 7 includes two measures of M(1,n), namely the maximum path length and the unweighted sum of path lengths. A weighted sum of path lengths could also have been included in FIG. 7, by following the example described supra for computing a weighted sum of path lengths for M(1,5).

For a given node n, use of the maximum path length for the measure M(1,n) represents embodiments in which only the most important contributing path from node 1 to node n is used to model M(1,n). Use of the unweighted sum of path lengths for the measure M(1,n) represents embodiments which reflect the collective effect on M(1,n) of the most important contributing path and of other contributing paths from node 1 to node n.

Only "non-inclusive paths" (i.e., those paths not wholly included within other paths) are shown in the table of FIG. 7. For example for impacted node 2, only path 1-2 is shown. For example, a path not shown for impacted node 2 is 1-2-3-4-5-2, because path 1-2 is wholly included within path 1-2-3-4-5-2. In actuality, there are an infinite number of such "inclusive paths" from node 1 to node 2 from looping around path 2-3-4-5-2 an arbitrary number of times. The set of such inclusive paths not included in Table 7 are: 1-2-[3-4-5-2]$_R$, where R denotes R repetitions of sub-path [3-4-5-2], R being any positive integer. In principle, the non-inclusive paths contribute to the measure M(1,n), but such contributions may be neglected in cases where such contributions are negligible. In cases where non-inclusive paths to the measure M(1,n) are accounted for, the effect of the non-inclusive paths may be modeled by appropriate mathematical or numerical techniques such by a geometric series model of the successive non-inclusive paths (i.e., for R=1, 2, 3, . . . ).

In the table of FIG. 7, node 1 may be viewed as a "source node" for inducing change in the other nodes. Interestingly, the initial change in the source node 1 that results in the changes in the other nodes actually feeds back to node 1 as an additional change in node 1, due to feedback from the changes in the other nodes. The feedback paths to node 1 are paths 1-2-3-4-5-2-1 and 1-2-5-4-3-2-1, as indicated in FIG. 7 and as may be verified from inspection of FIG. 6. The feedback effect on node 1 is relatively small, however, with a maximum path length of only 0.022 and an unweighted sum of path lengths of only 0.037.

In general, a measure M(N1,N2) of a change in a node N2 resulting from a change in node N1 is a function F of the path lengths of the paths from N1 to N2. The path length of each path is the product the pertinent edge weights (as illustrated in the preceding example) of the contiguous edges along each such path. In one embodiment, the function F may comprise maximum path length of said path lengths. In one embodiment, the function F may comprise an unweighted sum of said path lengths. In one embodiment, the function F may comprise a weighted sum of said path lengths.

FIG. 8 is a table depicting calculation of a measure of change M(1:6,n) in each node (n=1, 2, 3, 4, 5, 6) of FIG. 6 resulting from a change in nodes 1 and 6 of FIG. 6, in accordance with embodiments of the present invention. With both paths 1 and 6 affecting the measure M(1:6,n), a comparison of FIGS. 7 and 8 shows that M(1:6,n) exceeds M(1,n) for each indicated measure embodiment (i.e., maximum path length, unweighted sum of path lengths).

In the table of FIG. 8, nodes 1 and 6 may be viewed as a set of "source nodes" for inducing change in the other nodes. For the net configurations of FIGS. 4 and 5, the source nodes 1 and 6 are in different nets 71 and 73 in FIG. 4, and in a same net 74 in FIG. 5. In general, the source nodes of a set of sources nodes may include one or more source nodes (e.g., a single source node, a plurality of source nodes, etc.) such that the source nodes are in a same net, the source nodes are distributed among a plurality of nets of a same semantics, or the source nodes are distributed among a plurality of nets wherein at least two of nets of the plurality of nets have a different semantics.

Although the examples illustrated in FIGS. 7 and 8 employ a maximum path length and an unweighted sum of path lengths to model the measure M, the invention may generally utilize any other relevant function of the path lengths to model M (e.g., weighted sum of path lengths, product of path lengths or other nonlinear functions of path lengths, arithmetic average of path lengths, etc.). The context of the application to which the invention is applied will govern which functions of the path lengths may be beneficially utilized.

Figure 9:
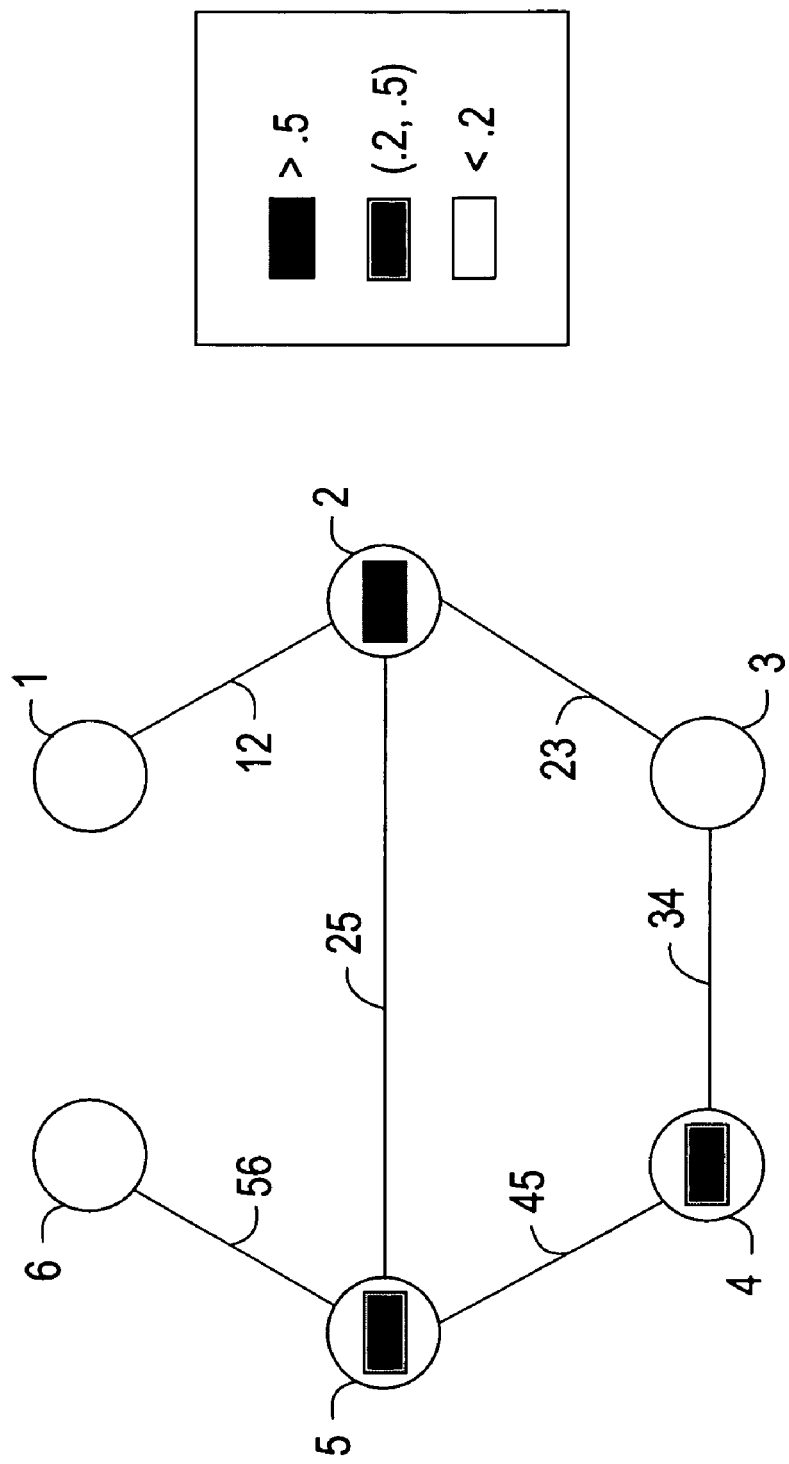
FIGS. 9-10 depicts the graph of FIG. 6 with each node being marked with a graphical representation to indicate a measure of change in each node from the table of FIG. 7, in accordance with embodiments of the present invention.
Figure 10:
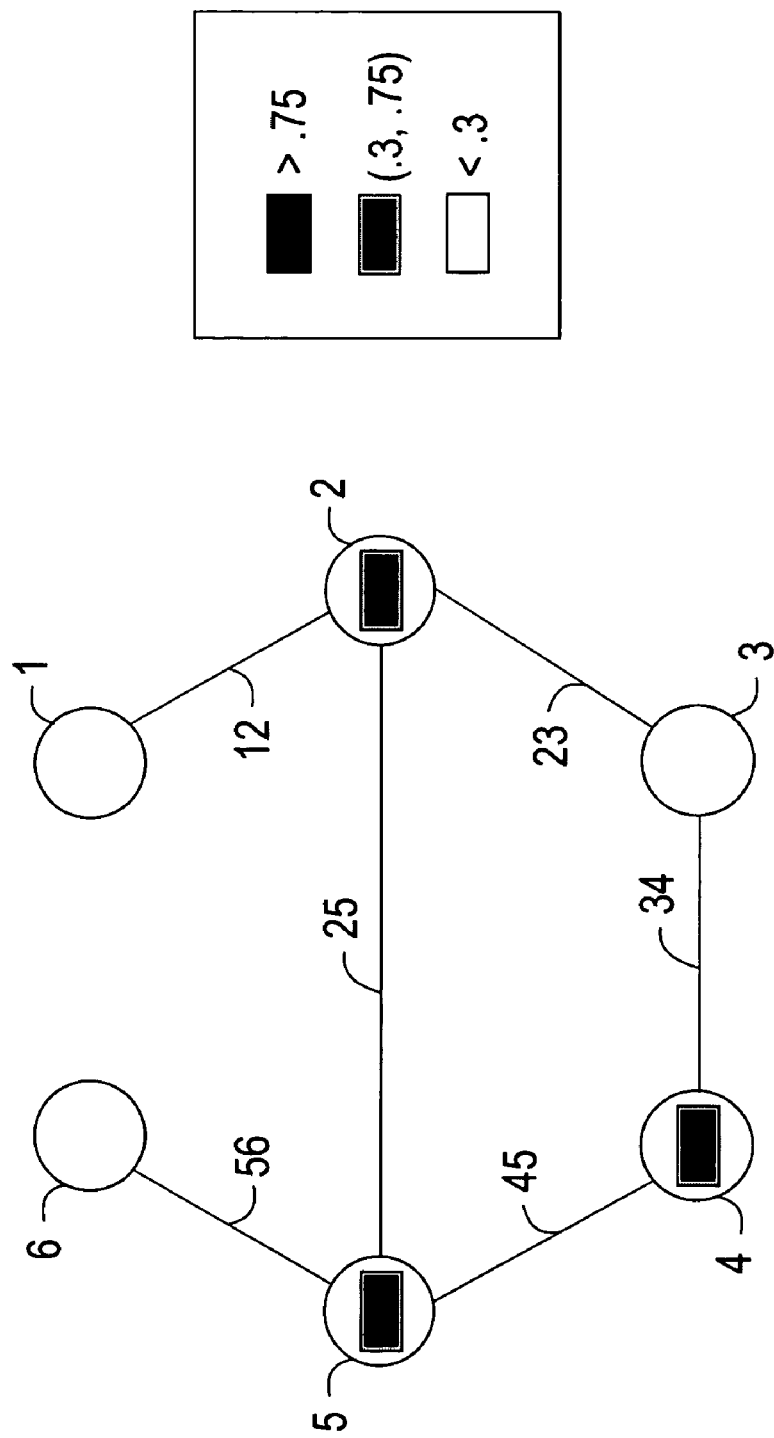

FIGS. 9-10 depicts the graph of FIG. 6 with each node n (n=1, 2, 3, 4, 5, 6) being marked with a graphical representation G(n) to indicate the measure M of change in each node from the table of FIG. 7, in accordance with embodiments of the present invention. In FIGS. 9-10, G(n) is expressed as a function of M, wherein shades of grey denote ranges of M.

In FIG. 9, the legend indicates that the three shades of grey representing G(n) denote the following ranges of M, wherein M represents the maximum path length:

M>0.5 (Darkest shade of grey);
0.2≦M≦5 (Medium shade of grey);
M<0.2 (Lightest shade of grey—white).

In FIG. 10, the legend indicates that the three shades of grey representing G(n) denote the following ranges of M, wherein M represents the unweighted sum of path lengths:

M>0.75 (Darkest shade of grey);
0.3≦M≦75 (Medium shade of grey);
M<0.3 (Lightest shade of grey—white).

Figure 11:
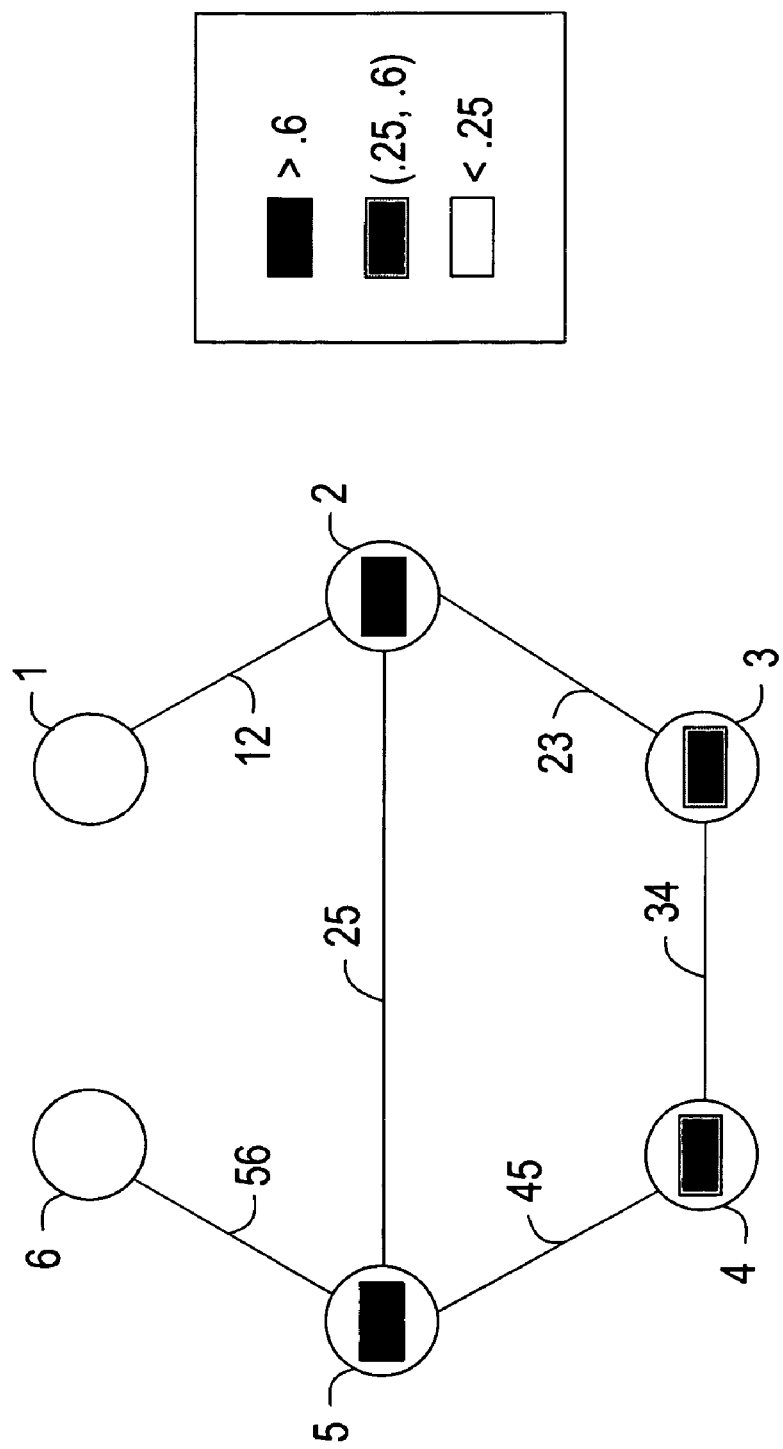
FIGS. 11-12 depicts the graph of FIG. 6 with each node being marked with a graphical representation to indicate a measure of change in each node from the table of FIG. 8, in accordance with embodiments of the present invention.
Figure 12:
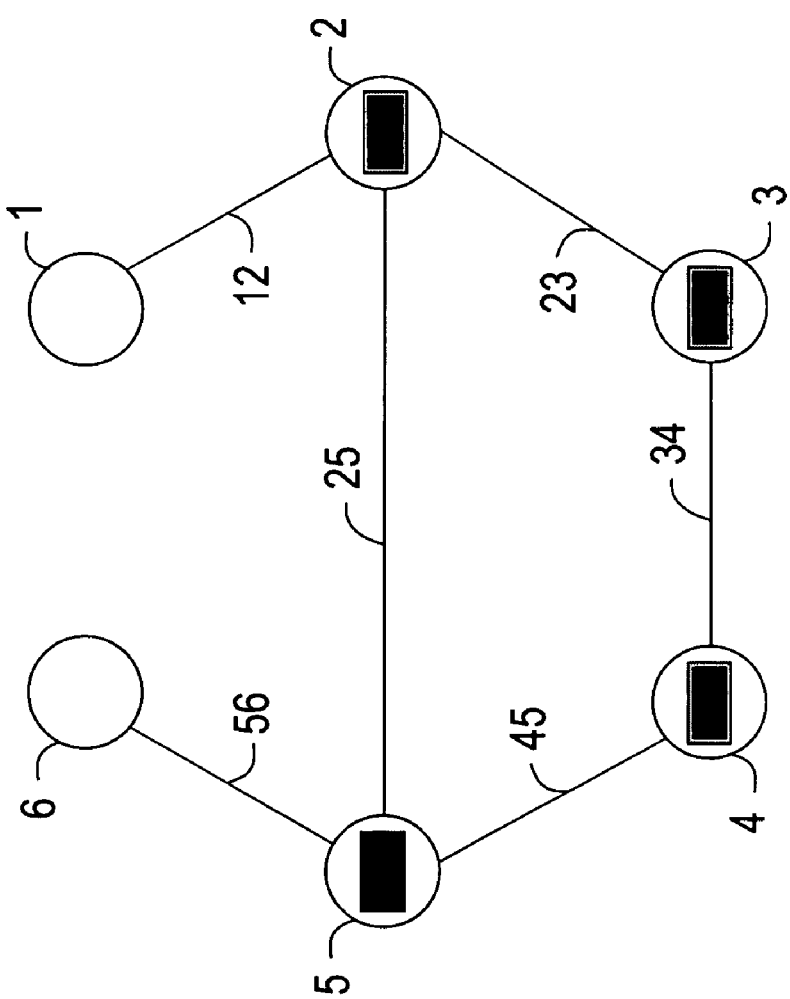

FIGS. 11-12 depicts the graph of FIG. 6 with each node n (n=1, 2, 3, 4, 5, 6) being marked with a graphical representation G(n) to indicate the measure M of change in each node from the table of FIG. 8, in accordance with embodiments of the present invention. In FIGS. 11-12, G(n) is expressed as a function of M, wherein shades of grey denote ranges of M.

In FIG. 11, the legend indicates that the three shades of grey representing G(n) denote the following ranges of M, wherein M represents the maximum path length:

M>0.6 (Darkest shade of grey);
0.25≦M≦6 (Medium shade of grey);
M<0.25 (Lightest shade of grey—white).

In FIG. 12, the legend indicates that the three shades of grey representing G(n) denote the following ranges of M, wherein M represents the unweighted sum of path lengths:

M>1.2 (Darkest shade of grey);
0.5≦M≦0.2 (Medium shade of grey);
M<0.5 (Lightest shade of grey—white).

Although FIGS. 9-12 use three shades of grey to differentiate different ranges of M for each node, the present invention generally utilizes two or more shades of grey to differentiate different ranges of M for each node. The shades of grey may increase in darkness as M increases (as in FIGS. 9-12), may alternatively decrease in darkness as M increases, or vary with darkness in any other manner.

More generally, FIGS. 9-12 illustrate that the present invention defines ranges of measure of a change one node resulting from a change in one or more other nodes, wherein the graphical representation G representing the change in the one node is specific to a range that includes M.

Moreover, the graphical representation G(n) may be expressed as a function of M in other nodes than shades of grey. In one embodiment, G(n) may be an icon. In one embodiment, the graphical representation G(n) may be a spectral color that is visible to a human being. The wavelength s(M) associated with the spectral color may be a monotonically increasing or decreasing function of M, wherein s(M) may be a linear or non-linear function of M Alternatively, the spectral color may vary with M in a manner other than monotonically increasing or decreasing, such as the "heat map" color usage, with red denoting high value and transitioning by approximate wavelength of color to blue denoting low numbers.

Figure 13:
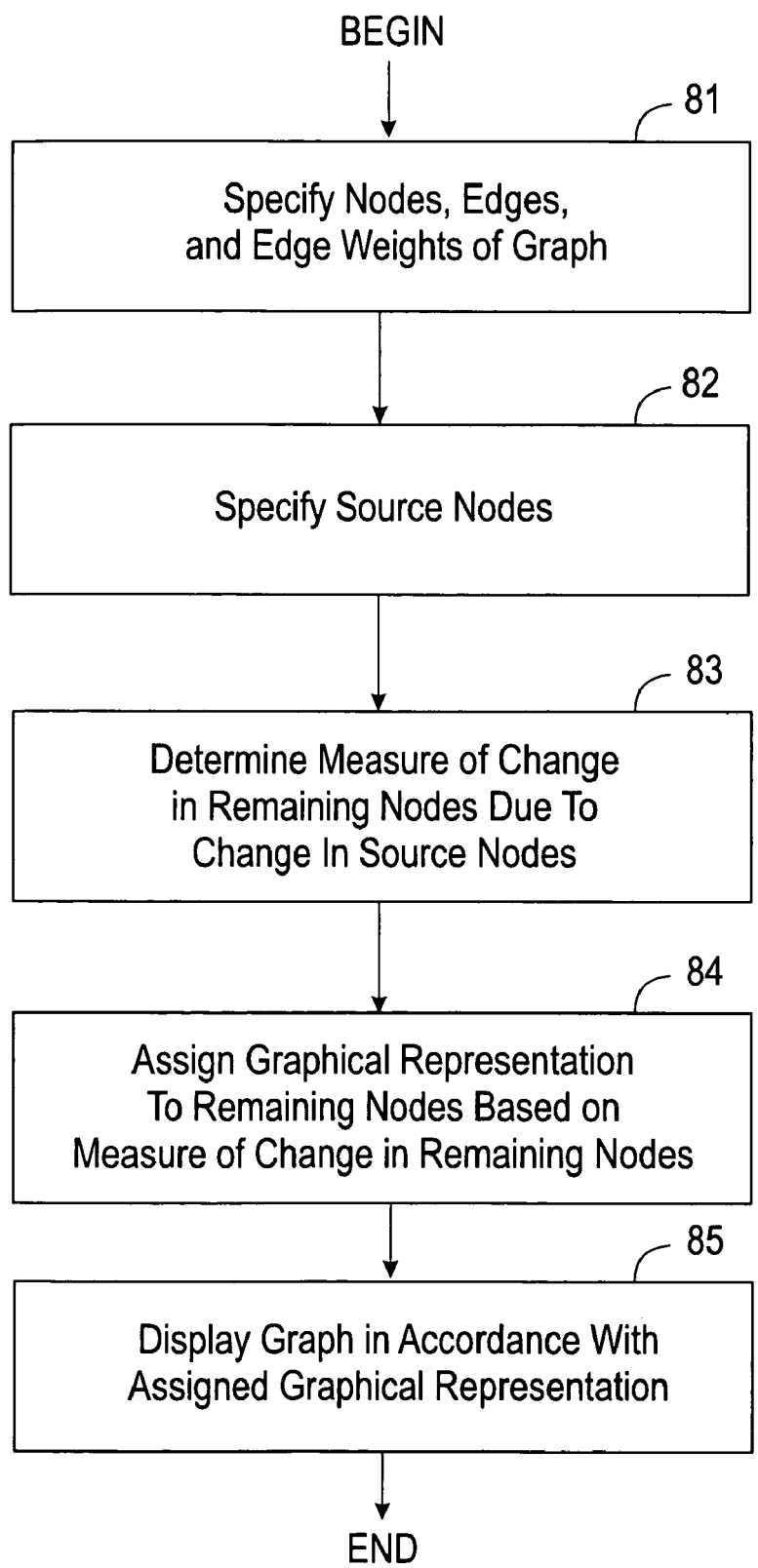
FIG. 13 is a flow chart for depicting a method for analyzing an impact of change in an organizational entity, in accordance with embodiments of the present invention.

FIG. 13 is a flow chart for depicting steps 81-85 a method for analyzing an impact of change in an organizational entity, in accordance with embodiments of the present invention.

Step 81 specifies nodes, edges, and edge weights of a graph H for an organizational entity. The graph H comprises a plurality P of nets. At least two nets of P have unique semantics. Each net of P comprises a plurality of nodes. Each node in each net of P is directly connected by an edge to at least one other node in each net in P. At least one node of each net of P is directly connected by an edge to at least one node of at least one other net of P. Each edge in H directly connects a first node and a second node such that said each edge comprises: (1) a first edge weight denoting a change in the second node resulting from a change in the first node and (2) a second edge weight denoting a change in the first node resulting from a change in the second node.

Step 82 specifies a set Z of source nodes A for inducing change in other nodes of the graph H.

Step 83 determines a measure of change in the remaining nodes of H due to change in the source nodes A of Z. Given the specified source nodes A in Z in a net X of P and for each node B characterized by a set S of at least one path of contiguous edges connecting nodes of H from node A to node B for each node A of Z, step 83 determines a measure M(Z,B) of a change in B resulting from a change in each node A of Z. M(Z,B) is a function of the edge weights comprised by each contiguous edge in each path of S. The first and second edge weights of a contiguous edge of a path of S: may be equal, may be unequal, may be zero and positive respectively, etc.

In one embodiment, a node of said each node B may be in a net Y of P that differs from the net X, wherein the nets X and Y have a same semantics. In one embodiment, a node of said each node B may be in a net Y of P that differs from the net X, wherein the nets X and Y have different semantics. In one embodiment, a node of said each node B is in a net Y of P, wherein G(B) is a function of M(Z,B) and Y.

The measure M(Z,B) may be determined by: computing a path length of each path of S; and determining M(Z,B) as a function of the computed path lengths. Each path of S may be computed as a product of the first or second edge weight of each contiguous edge of each path of S. In one embodiment, the computed path lengths may be a maximum path length of the computed path lengths. In one embodiment, the computed path lengths may be an unweighted sum of the computed path lengths. In one embodiment, the computed path lengths may be a weighted sum of the computed path lengths.

Step 84 assigns a graphical representation G(B) to said each node B, wherein G(B) is a function of M(Z,B).

Step 85 displays the graph H such that said each node B is displayed in accordance with the graphical representation G(B) assigned to each node B. G(B) may be, inter alia, an icon, a color, a shade of grey, etc. For example, G(B) may be a shade of grey that is a monotonically increasing or decreasing function of M(Z,B). In addition, ranges of measure of a change in B resulting from a change in A may be specified, wherein G(B) is specific to a range of said ranges that includes M(Z,B).

G(B) may be a spectral color that is visible to a human being. A wavelength s(M,B) of the spectral color for G(B) may be a monotonically increasing or decreasing function of M(Z,B). The wavelength s(M,B) may be a linear or non-linear function of M(Z,B).

Figure 14:
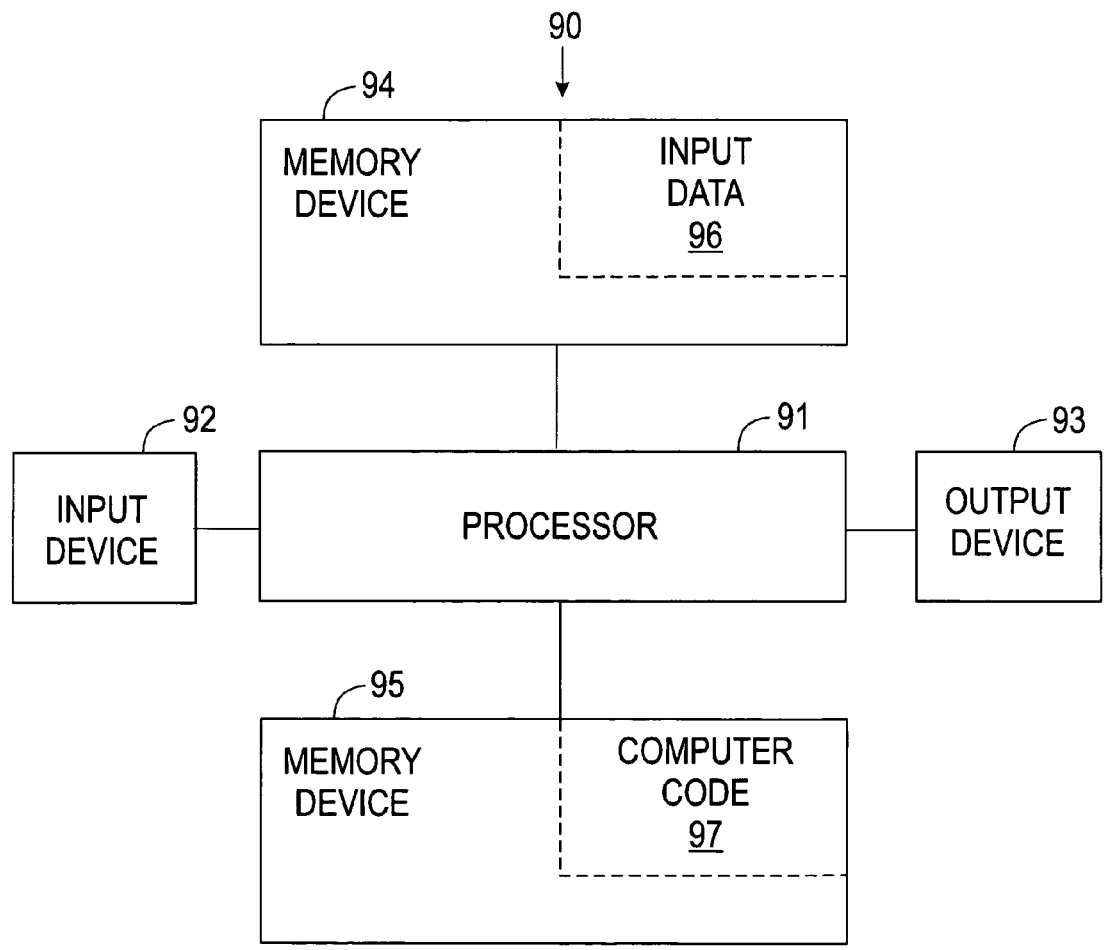
FIG. 14 illustrates a computer system used for analyzing an impact of change in an organizational entity, in accordance with embodiments of the present invention.

FIG. 14 illustrates a computer system 90 used for analyzing an impact of change in an organizational entity, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for analyzing an impact of change in an organizational entity. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 14) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computerized method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

2. The method of claim 1, wherein determining the measure M(Z,B) comprises:

computing a path length of each path of S; and determining M(Z,B) as a function of said computed path lengths.

3. The method of claim 2, wherein said computing the path length of each path of S comprises computing the path length of each path of S as a product of the successive first edge weights or of the successive second edge weights of the contiguous edges along said each path of S.

4. The method of claim 2, wherein said function of said computed path lengths is a maximum path length of said computed path lengths.

5. The method of claim 2, wherein said function of said computed path lengths is a weighted or unweighted sum of said computed path lengths.

6. The method of claim 1, wherein a node of said nodes A is in a net X of P, wherein a node of said each node B is in a net Y of P that differs from the net X, and wherein the nets X and Y have different semantics.

7. The method of claim 1, wherein G(B) is an icon, a color, or a shade of grey.

8. The method of claim 1, wherein the plurality of nets consists of a resource net, a capability net, a process net, and a role net.

9. A computer program product, comprising a computer usable medium having a computer readable program that when executed on a computer causes the computer to perform a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

10. The computer program product of claim 9, wherein determining the measure M(Z,B) comprises:

computing a path length of each path of S; and determining M(Z,B) as a function of said computed path lengths.

11. The computer program product of claim 10, wherein said computing the path length of each path of S comprises computing the path length of each path of S as a product of the successive first edge weights or of the successive second edge weights of the contiguous edges along said each path of S.

12. The computer program product of claim 9, wherein G(B) is an icon, a color, or a shade of grey.

13. A computer system comprising a processor and a computer readable memory unit coupled to the processor, said memory unit containing instructions that when executed by the processor implement a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

14. The computer system of claim 13, wherein determining the measure M(Z,B) comprises:

computing a path length of each path of S; and determining M(Z,B) as a function of said computed path lengths.

15. The computer system of claim 14, wherein said computing the path length of each path of S comprises computing the path length of each path of S as a product of the successive first edge weights or of the successive second edge weights of the contiguous edges along said each path of S.

16. The computer system of claim 13, wherein G(B) is an icon, a color, or a shade of grey.

17. A process for deploying computing infrastructure, said process comprising integrating computer-readable code into a computing system, wherein the code in combination with the computing system is capable of performing a method for analyzing an impact of change in an organizational entity, said method comprising:

specifying a graph H for the organizational entity, said graph H comprising a plurality P of nets, at least two nets of P having unique semantics, each net of P comprising a plurality of nodes, each node in each net of P being directly connected by an edge to at least one other node in said each net in P, at least one node of each net of P directly connected by an edge to at least one node of at least one other net of P, each edge in H directly connecting a first node and a second node such that said each edge comprises (1) a first edge weight denoting a change in the second node resulting from a change in the first node and (2) a second edge weight denoting a change in the first node resulting from a change in the second node;

for a given set Z of nodes A in H and for each node B characterized by a set S of at least one path of contiguous edges connecting nodes of H from node A to node B for each node A of Z, determining a measure M(Z,B) of a change in node B resulting from a change in each node A of Z, said M(Z,B) being a function of the edge weights comprised by each contiguous edge in each path of S;

assigning a graphical representation G(B) to said each node B, said G(B) being a function of M(Z,B); and displaying the graph H such that said each node B is displayed in accordance with the graphical representation G(B) assigned to said each node B.

18. The process of claim 17, wherein determining the measure M(Z,B) comprises:

computing a path length of each path of S; and determining M(Z,B) as a function of said computed path lengths.

19. The process of claim 18, wherein said computing the path length of each path of S comprises computing the path length of each path of S as a product of the successive first edge weights or of the successive second edge weights of the contiguous edges along said each path of S.

20. The process of claim 17, wherein G(B) is an icon, a color, or a shade of grey.

* * * * *

UNITED STATES PATENT AND TRADEMARK OFFICE
CERTIFICATE OF CORRECTION

PATENT NO. : 7,580,913 B2
APPLICATION NO. : 11/188600
DATED : August 25, 2009
INVENTOR(S) : Chandra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Fourteenth Day of September, 2010

David J. Kappos
*Director of the United States Patent and Trademark Office*